United States Patent [19]
Yokoi et al.

[11] Patent Number: 5,282,239
[45] Date of Patent: Jan. 25, 1994

[54] CORDLESS TELEPHONE SYSTEM FOR MOVING CONVEYANCES

[75] Inventors: Yuji Yokoi; Takehiro Inoue, both of Amagasaki, Japan

[73] Assignee: Mitsubishi Denki Kabushiki Kaisha, Tokyo, Japan

[21] Appl. No.: 910,505

[22] Filed: Jul. 8, 1992

[30] Foreign Application Priority Data

Jul. 9, 1991 [JP] Japan .................. 3-193721
Jul. 19, 1991 [JP] Japan .................. 3-203618

[51] Int. Cl.⁵ .......................... H04M 11/00
[52] U.S. Cl. ............................ 379/58; 379/60; 379/61
[58] Field of Search ........... 379/56, 57, 58, 60, 379/61, 63, 210; 455/11.1, 33.1, 69

[56] References Cited

U.S. PATENT DOCUMENTS

| | | | |
|---|---|---|---|
| 4,456,793 | 6/1984 | Baker et al. | 379/61 |
| 4,748,655 | 5/1988 | Thrower et al. | 379/60 |
| 4,789,049 | 12/1988 | Watanabe et al. | 187/130 |
| 4,906,989 | 3/1990 | Kasugai | 340/825.44 |

FOREIGN PATENT DOCUMENTS

| | | | |
|---|---|---|---|
| 3621990 | 1/1987 | Fed. Rep. of Germany . | |
| 3528886 | 2/1987 | Fed. Rep. of Germany . | |
| 0040611 | 2/1991 | Japan | 379/60 |
| 0078332 | 4/1991 | Japan | 379/58 |
| 4-113727 | 4/1992 | Japan | 379/61 |
| 2157131 | 10/1985 | United Kingdom . | |

OTHER PUBLICATIONS

Patent Abstracts of Japan vol. 13, No. 552, 8 Dec. 1989 (JP-A-12 26 684).
Patent Abstracts of Japan vol. 13, No. 465, 20 Oct. 1989 (JP-A-11 81 687).
Burke, T., Proceedings of the National Communications Forum, vol. 43, No. 2, Oct. 1989.
European Search Report EP 92 30 6071 dated 28 Jul. 1993.

*Primary Examiner*—Jin F. Ng
*Assistant Examiner*—William D. Cumming
*Attorney, Agent, or Firm*—Rothwell, Figg, Ernst & Kurz

[57] ABSTRACT

A cordless telephone system serves a building with a moving conveyance such as an elevator. The system has at least one portable cordless telephone, at least one fixed base station that communicates with the portable cordless telephone by a wireless circuit outside the moving conveyance, and a moving-conveyance base station that communicates with the portable cordless telephone by a wireless circuit inside the moving conveyance. A central switch routes calls to the fixed base station or moving-conveyance base station according to the field strength of signals received at these stations from the portable cordless telephone.

20 Claims, 13 Drawing Sheets

CORDLESS TELEPHONE SYSTEM FOR MOVING CONVEYANCES

BACKGROUND OF THE INVENTION

This invention relates to a cordless telephone system for use in a building with one or more moving conveyances, such as an office building with elevators or a factory with moving overhead cranes.

Cordless in-building telephone systems have been available for several years. A typical system comprises a central switch coupled by wires to external lines, to extension telephones installed in rooms of the building, and to fixed base stations installed in rooms and corridors of the building. Hand-held portable telephones communicate via wireless links with the base stations, thus enabling calls to be set up between a pair of portable telephones, or a portable telephone and an extension telephone, or a portable telephone and an outside telephone.

In existing systems a problem occurs when a person making a call with a portable telephone enters a moving conveyance such as an elevator. Initially, the call is relayed by a base station near the entrance to the elevator, but the elevator rapidly carries the person away from this base station, thereby weakening the wireless link between the base station and the portable telephone. As the separation increases the quality of the link deteriorates, making communication difficult, and when a certain separation is reached the link is broken, cutting off the call. Reliable telephone communication from a moving elevator is thus impossible.

SUMMARY OF THE INVENTION

It is accordingly an object of the present invention to enable cordless telephone calls to continue when the party using the cordless telephone boards a moving conveyance.

Another object of the invention is to avoid having telephone calls cut off because of movement of the moving conveyance.

Yet another object of the invention is to enable automatic hand-off of calls made from a moving conveyance.

Still another object of the invention is to avoid interference between calls made from adjacent moving conveyances.

The invented cordless telephone system comprises a portable cordless telephone for making calls, at least one fixed base station for wireless communication with the portable cordless telephone outside a moving conveyance, and a moving-conveyance base station for wireless communication with the portable cordless telephone inside the moving conveyance. A central switch, coupled to the fixed base station and moving-conveyance base station, hands off calls between the fixed base station and moving-conveyance base station according to the field strength of signals from the portable cordless telephone received at the fixed base station and the moving-conveyance base station.

DETAILED DESCRIPTION OF THE INVENTION

Embodiments of the invention will be described with reference to the attached drawings. The moving conveyances will be elevators in FIGS. 1 to 13 and cranes in FIG. 14, but the invention is not restricted to these conveyances, being applicable to other moving conveyances as well.

Figure 1:
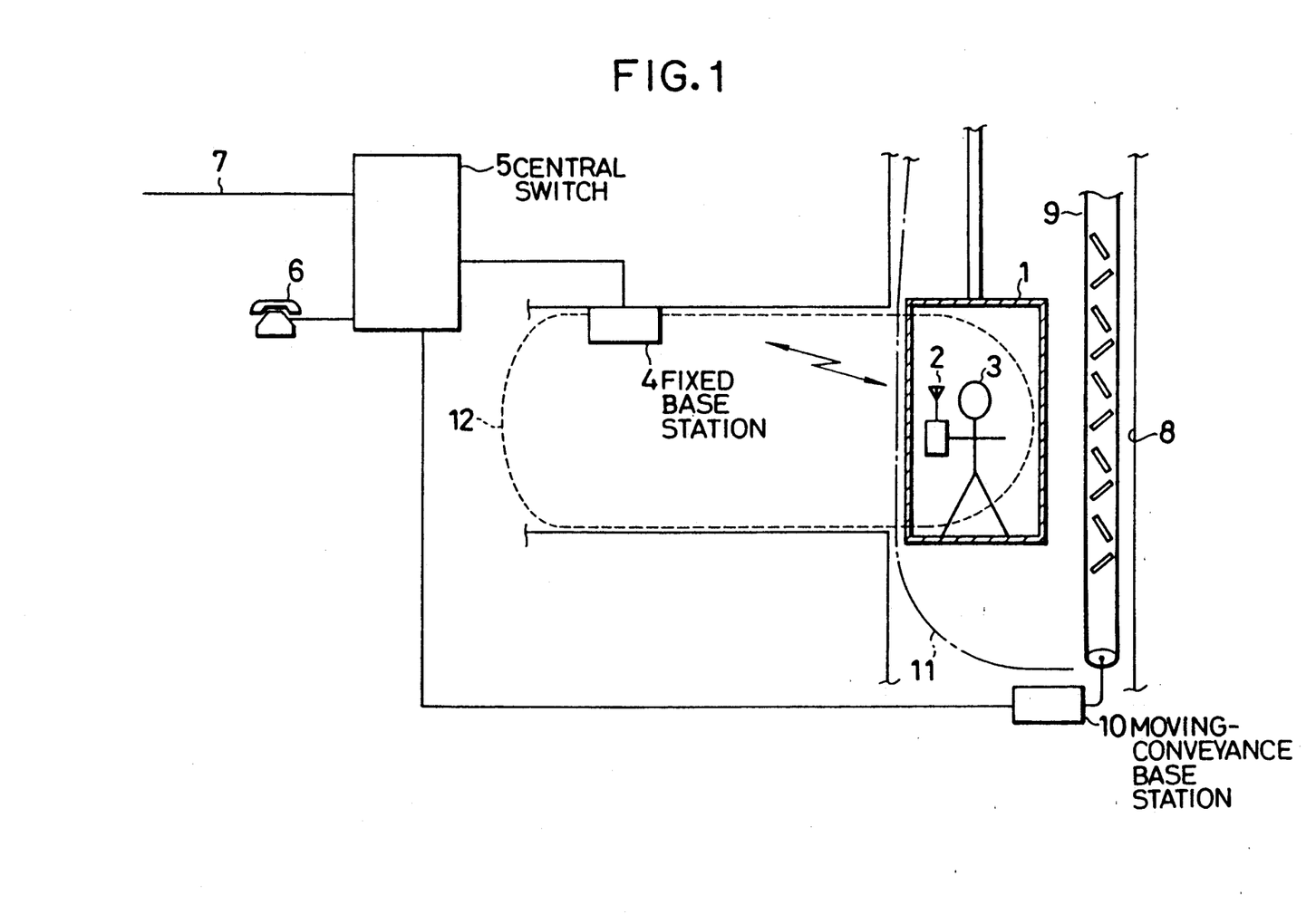
FIG. 1 is a drawing of the invented cordless telephone system, illustrating a radiating coaxial cable used as the antenna of the moving-conveyance base station.

FIG. 1 shows a building with an elevator 1. The cordless telephone system comprises a portable cordless telephone 2 which can be carried by a person 3 and is used for making telephone calls, and a fixed base station 4 installed in the building for wireless communication with the portable cordless telephone 2. The wireless communication circuit between the portable cordless telephone 2 and the fixed base station 4 comprises a voice channel and a control channel. The drawing shows only one fixed base stations 4 installed on the ceiling of a corridor near an entrance to the elevator 1, but there may be other fixed base stations 4 installed elsewhere on the ceilings of the same and other corridors, and on the ceilings of rooms in the building, at enough locations to provide substantially complete coverage of the interior of the building.

All of the base stations 4 are coupled by wires to a central switch 5. The central switch 5 is, for example, a conventional private branch exchange with additional features for polling and handling off calls, as described later. Extension telephones 6 (of which only one is shown in the drawing) are installed in the building and coupled by wires to the central switch 5 in the conventional manner. The central switch 5 is also coupled to a common-carrier line 7 for access to a public telephone network.

The elevator 1 travels in an elevator shaft 8 equipped with a radiating coaxial cable 9. A radiating coaxial cable is a coaxial cable with a perforated shield that permits leakage of electromagnetic radiation. The radiating coaxial cable 9 runs the full length of the elevator shaft 8 and is coupled at one end to a moving-conveyance base station 10, for which it serves as an antenna. The moving-conveyance base station 10 is coupled by wires to the central switch 5.

The effective radiating range of the portable cordless telephone 2 and the radiating coaxial cable 9 are such that wireless communication can be established between them when the portable cordless telephone 2 is anywhere in the elevator shaft 8. In this case also, the wireless communication circuit comprises a voice channel and a control channel. The service range 11 of the moving-conveyance base station 10 extends the length of the elevator shaft 8, but does not extend into adjacent corridors and rooms of the building. The service range 12 of the fixed base station 4 extends into the elevator 1 when the elevator 1 is stopped at the same floor as the fixed base station 4.

Next the operation will be explained.

The fixed base station 4 and moving-conveyance base station 10 periodically send out polling signals. The portable cordless telephone 2 responds to received polling signals by sending back an identification signal. The identification signal is relayed from any fixed base station 4 or moving-conveyance base station 10 that receives it to the central switch 5. In this way the central switch 5 learns which base stations are accessible to the portable cordless telephone 2. The central switch 5 also tests the received field strength of the identification signals sent from the portable cordless telephone 2 to the base stations, selects a base station at which the field strength is above a threshold level sufficient for satisfactory communication, and assigns the portable cordless telephone 2 to the selected base station.

The method of assigning base stations can be embellished in various ways without departing from the scope of the invention. For example, instead of selecting a base station with a received field strength above a given threshold, the central switch can assign the portable cordless telephone to the base station with the highest received field strength.

If the person 3 is standing under the fixed base station 4 in FIG. 1 waiting for the elevator 1 to arrive, when a polling signal is sent, the identifying response from the portable cordless telephone 2 will be relayed strongly from the fixed base station 4 but weakly or not at all from the moving-conveyance base station 10 to the central switch 5. The central switch 5 will accordingly assign the portable cordless telephone 2 to the fixed base station 4.

In this state, if the portable cordless telephone 2 is called from the extension telephone 6, the central switch 5 will route the call to the fixed base station 4, which sends a call originating signal via the wireless control channel to the portable cordless telephone 2. When the person 3 answers the call by pressing a button on the portable cordless telephone 2, a voice channel is set up between the portable cordless telephone 2 and the extension telephone 6, via the fixed base station 4 and central switch 5, enabling the person 3 to converse with a party at the extension telephone 6.

When the elevator 1 arrives and the person 3 gets in, at first the call continues to be relayed via the fixed base station 4, as shown in FIG. 1. As the elevator 1 carries the person 3 and portable cordless telephone 2 away from the fixed base station 4, however, the field strength of identification signals received from the portable cordless telephone 2 in response to polling from the fixed base station 4 drops. Since the portable cordless telephone 2 is now in the elevator shaft 8, the field strength of identification signals received from the portable cordless telephone 2 in response to polling from the moving-conveyance base station 10 is strong. When the received field strength at the fixed base station 4 drops below the threshold value, the central switch 5 hands the call off from the fixed base station 4 to the moving-conveyance base station 10; that is, it reroutes the call so that it is relayed via the moving-conveyance base station 10 instead of the fixed base station 4. The person 3 can thus continue to converse with the party at the extension telephone 6.

When the person 3 gets out of the elevator 1 on another floor, the call is handed off in a similar way to another fixed base station on that floor, enabling the call to continue. Calls from the portable cordless telephone 2 to the extension telephone 6, or to another portable cordless telephone, or to an external telephone via the common-carrier line 7 are similarly handed off.

The person 3 can also originate or receive a new call while riding the elevator 1. When the person leaves the elevator 1, the call will be handed off to a fixed base station. In short, the person 3 can enjoy completely normal cordless telephone service even while using the elevator.

Figure 2:
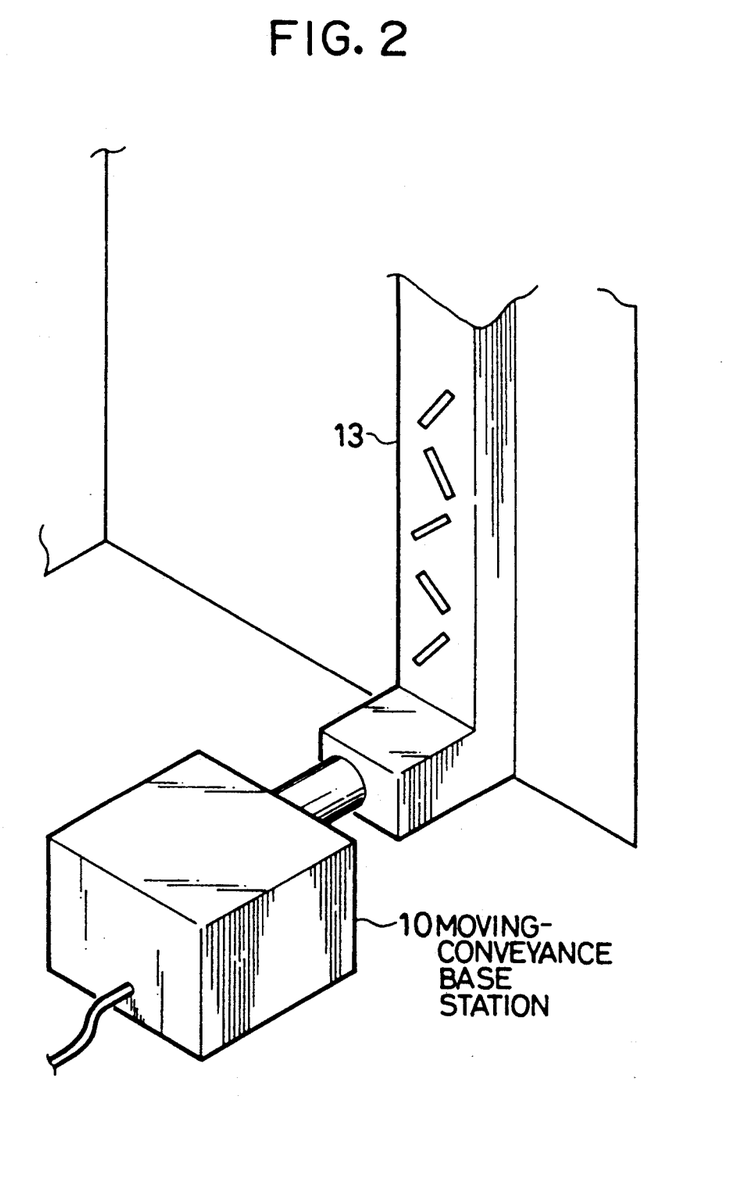
FIG. 2 illustrates use of a leakage waveguide as the antenna of the moving-conveyance base station.

In place of the radiating coaxial cable 9 in FIG. 1, other types of antennas can be used. For example, a leakage waveguide 13 can be used as illustrated in FIG. 2. The leakage waveguide 13 provides the same functions as the radiating coaxial cable 9, but is more efficient at short wavelengths.

Figure 3:
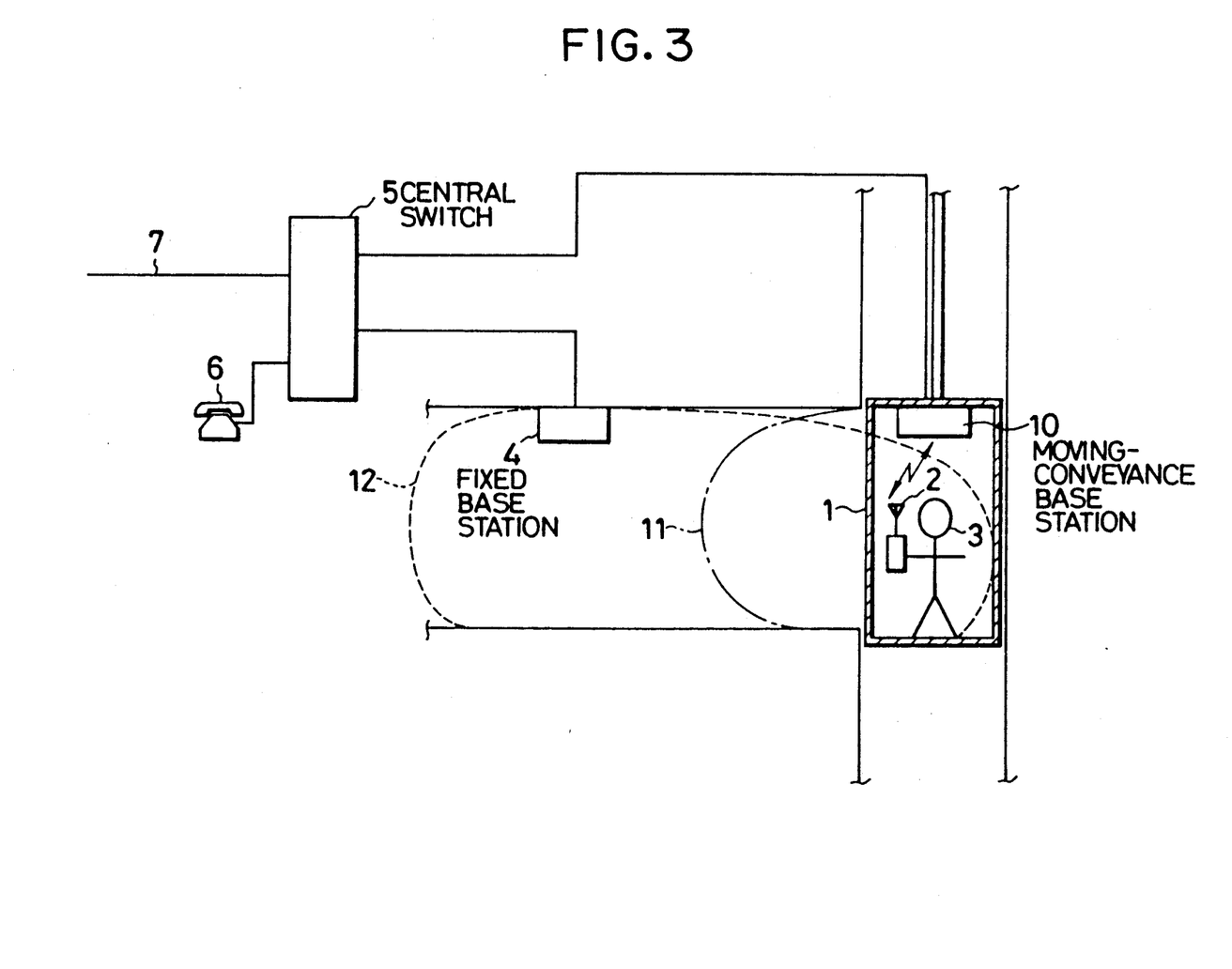
FIG. 3 illustrates a cordless telephone system in which the moving-conveyance base station is installed in an elevator.

Referring to FIG. 3, it is possible to install the moving-conveyance base station 10 directly in the elevator 1. In this case the antenna is, for example, a conventional dipole antenna built into the moving-conveyance base station 10. The moving-conveyance base station 10 is coupled to the central switch 5 by wires running parallel to the elevator cable that supports the elevator 1. Operation is the same as before, except that the portable cordless telephone 2 communicates directly with the moving-conveyance base station 10, without the need for a radiating coaxial cable or leakage waveguide.

In FIG. 3 the service range 11 of the moving-conveyance base station 10 extends outside the elevator 1 into the corridor in which the fixed base station 4 is installed. In this case, if the person 3 originates or receives a call shortly after getting out of the elevator 1, while the elevator 1 is still stopped at the same floor, the call will be routed through the moving-conveyance base station 10. When the elevator 1 moves away from this floor, however, the central switch 5 will automatically hand off the call from the moving-conveyance base station 10 to the fixed base station 4, allowing conversation to continue without interruption.

Figure 4:
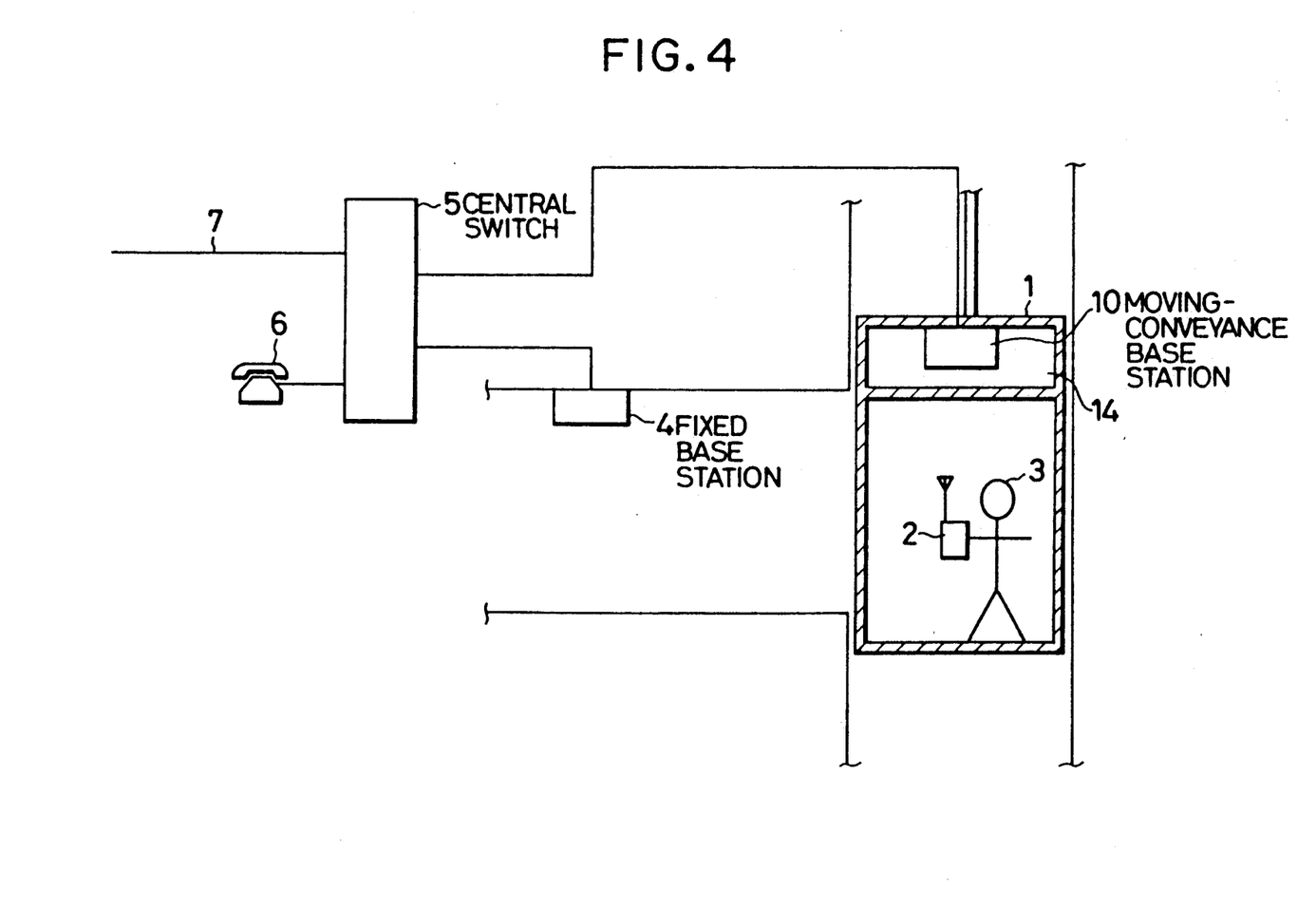
FIG. 4 illustrates a cordless telephone system in which the moving-conveyance base station is installed in a ceiling cavity of an elevator.

Referring to FIG. 4, the moving-conveyance base station 10 can be installed in a ceiling cavity 14 of the elevator 1. This provides the same effects as in FIG. 3 without impairing the interior appearance of the elevator.

Figure 5:
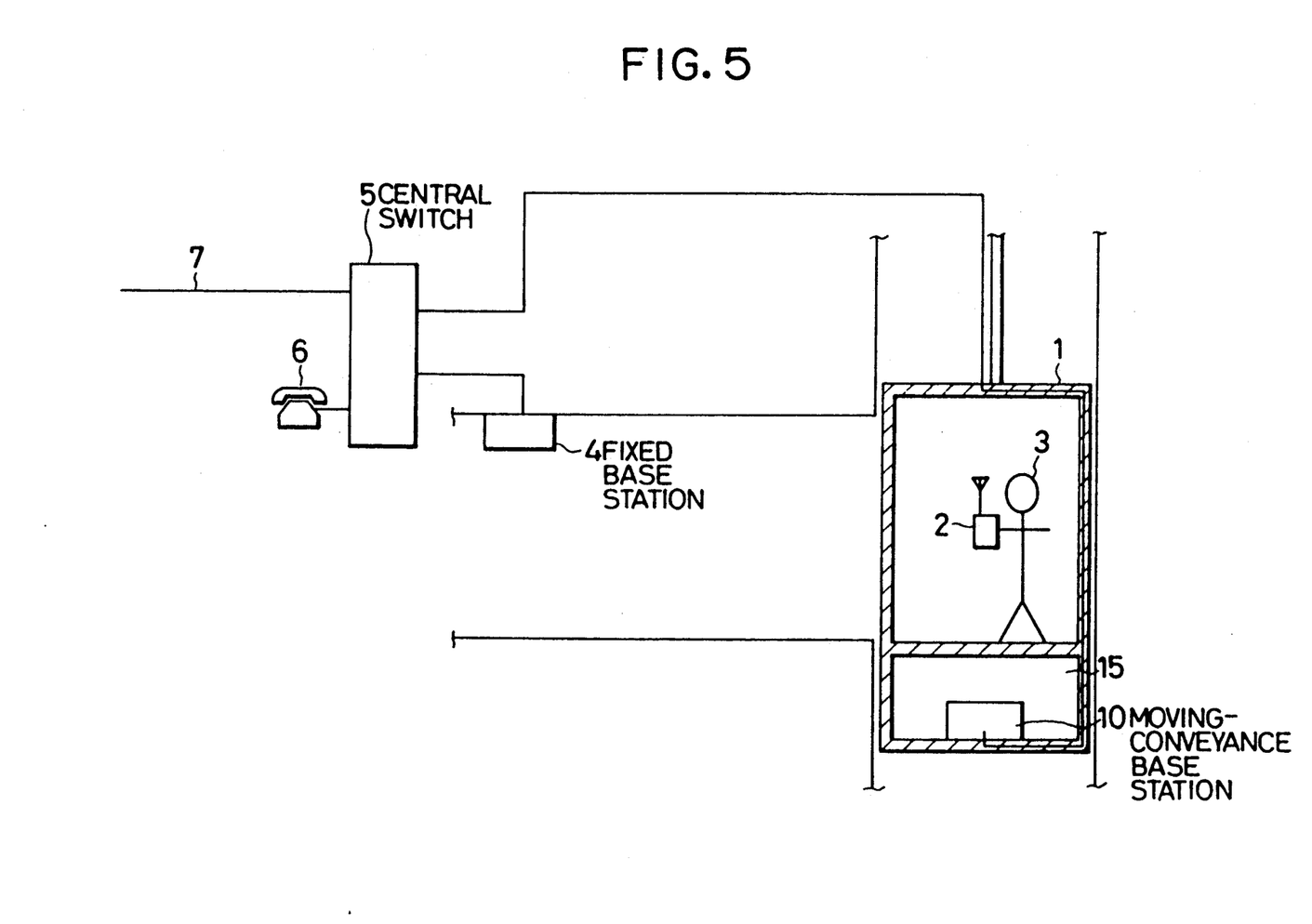
FIG. 5 illustrates a cordless telephone system in which the moving-conveyance base station is installed in a floor cavity of an elevator.

Referring to FIG. 5, the moving-conveyance base station 10 can be installed in a floor cavity 15 of the elevator 1, providing the same effects and benefits as in FIG. 4.

Figure 6:
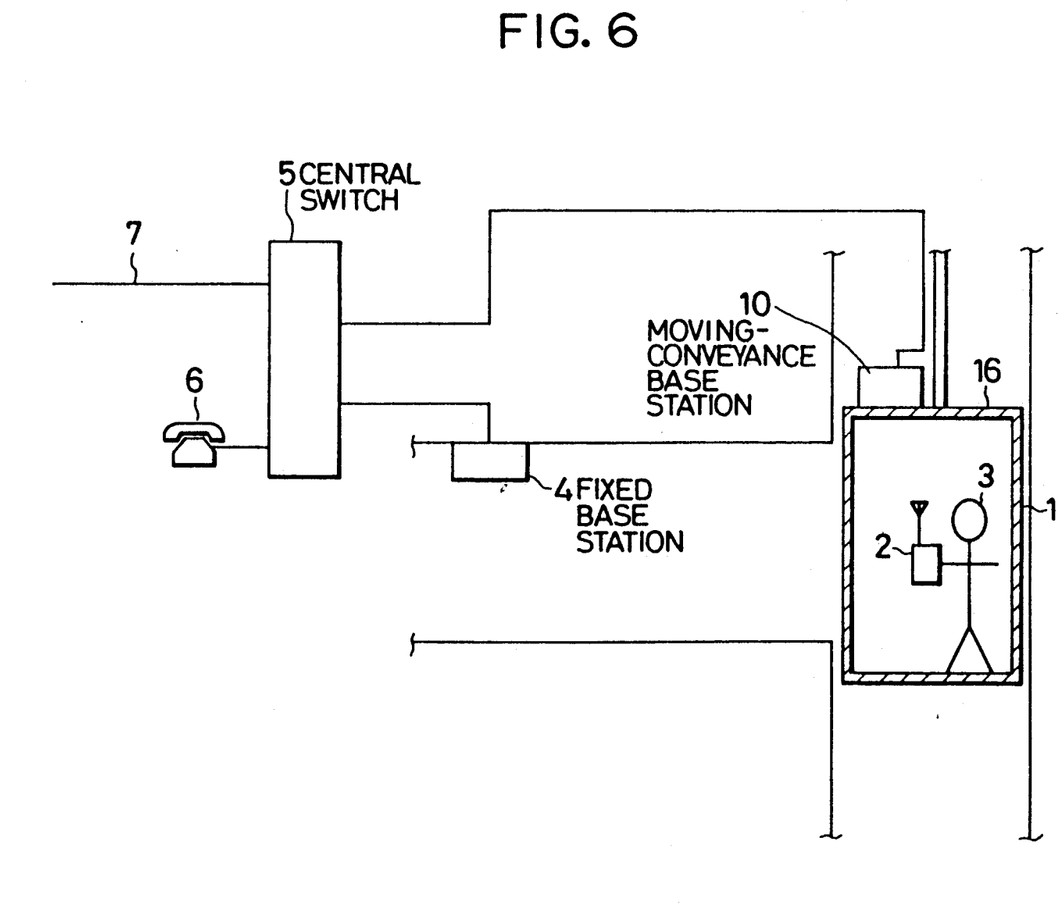
FIG. 6 illustrates a cordless telephone system in which the moving-conveyance base station is installed on an external upper surface of an elevator.

Referring to FIG. 6, the moving-conveyance base station 10 can be installed on an external upper surface 16 of the elevator 1. The system operates in the same way as in FIGS. 3 to 5, with the advantage of easier installation and maintenance of the moving-conveyance base station 10.

Figure 7:
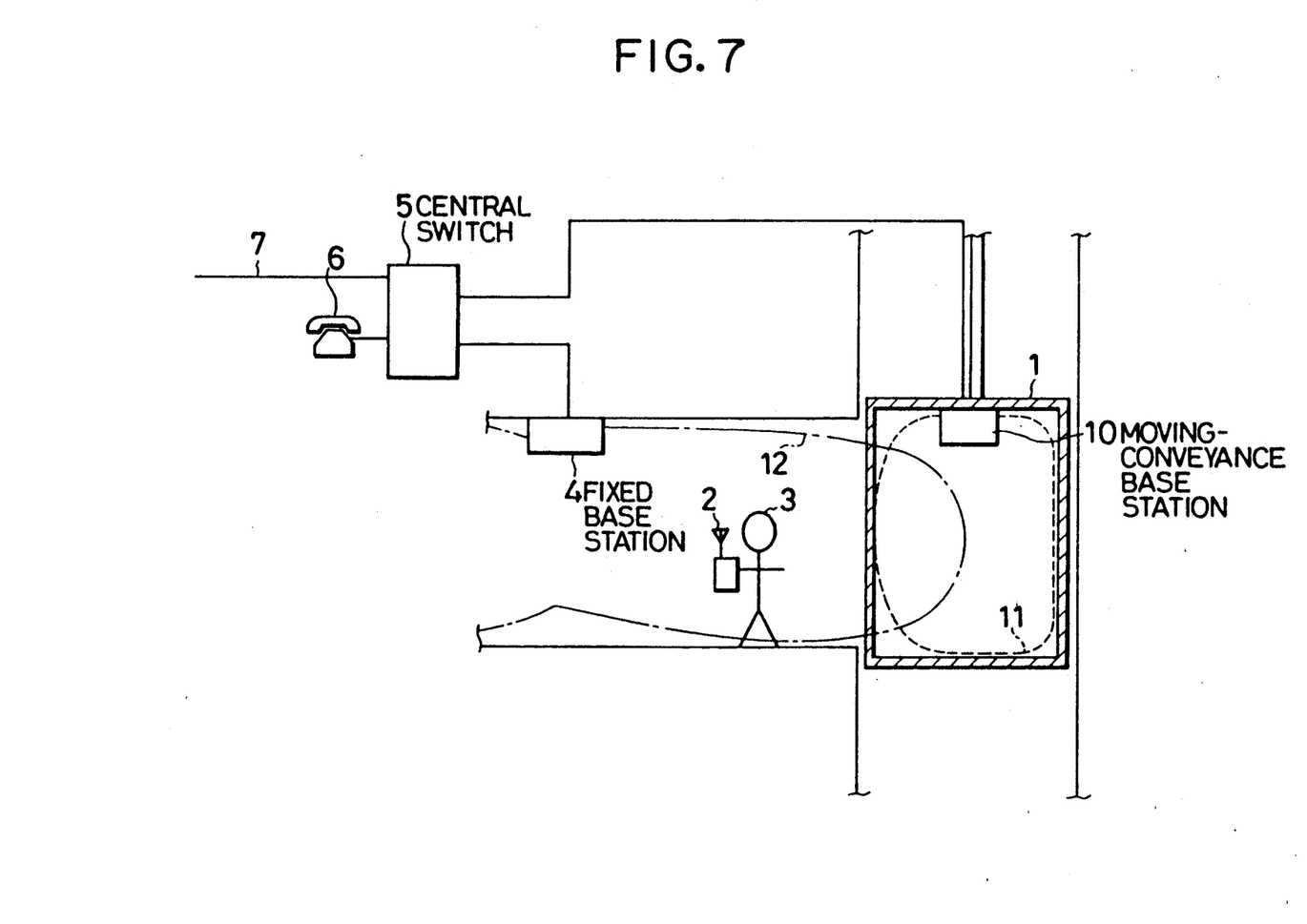
FIG. 7 illustrates a cordless telephone system in which the service range of the moving-conveyance base station is restricted to the interior of an elevator.

Referring to FIG. 7, it is possible to design the moving-conveyance base station 10 so that its service range 11 is confined to the interior of the elevator 1. This arrangement has the advantage that when the person 3 is standing in the corridor at the entrance to the elevator waiting to ride the elevator up, for example, if the elevator stops at this floor on its way down, the portable cordless telephone 2 will not be accidentally reassigned to the moving-conveyance base station 10 even if there should be momentary drop in received field strength at the fixed base station 4. Thus if the person 3 is making a call via the fixed base station 4, the call will not be needlessly handed off to the moving-conveyance base station 10.

Figure 8:
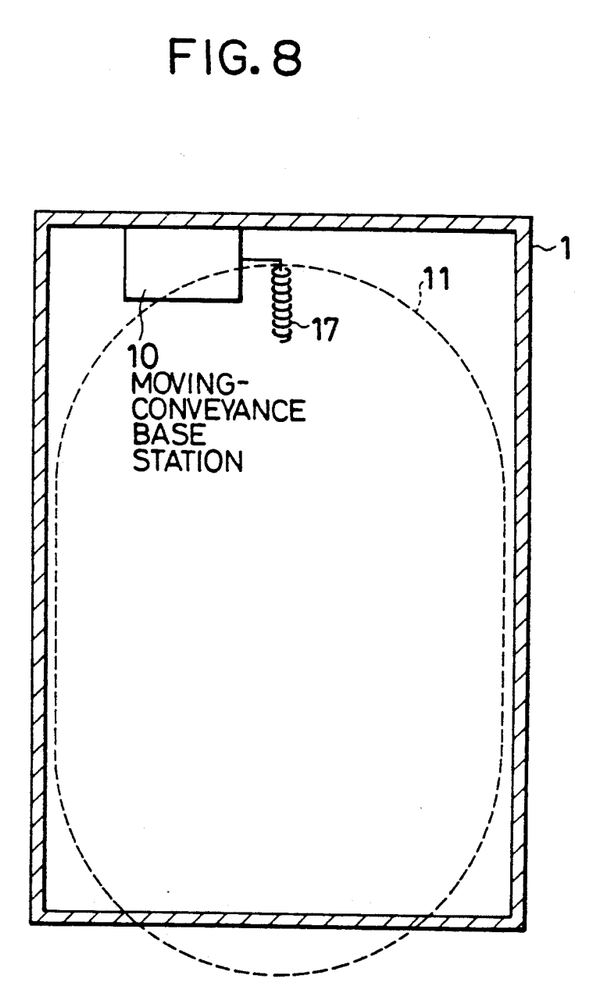
FIG. 8 illustrates a helical antenna for the moving-conveyance base station in FIG. 7.
Figure 9:
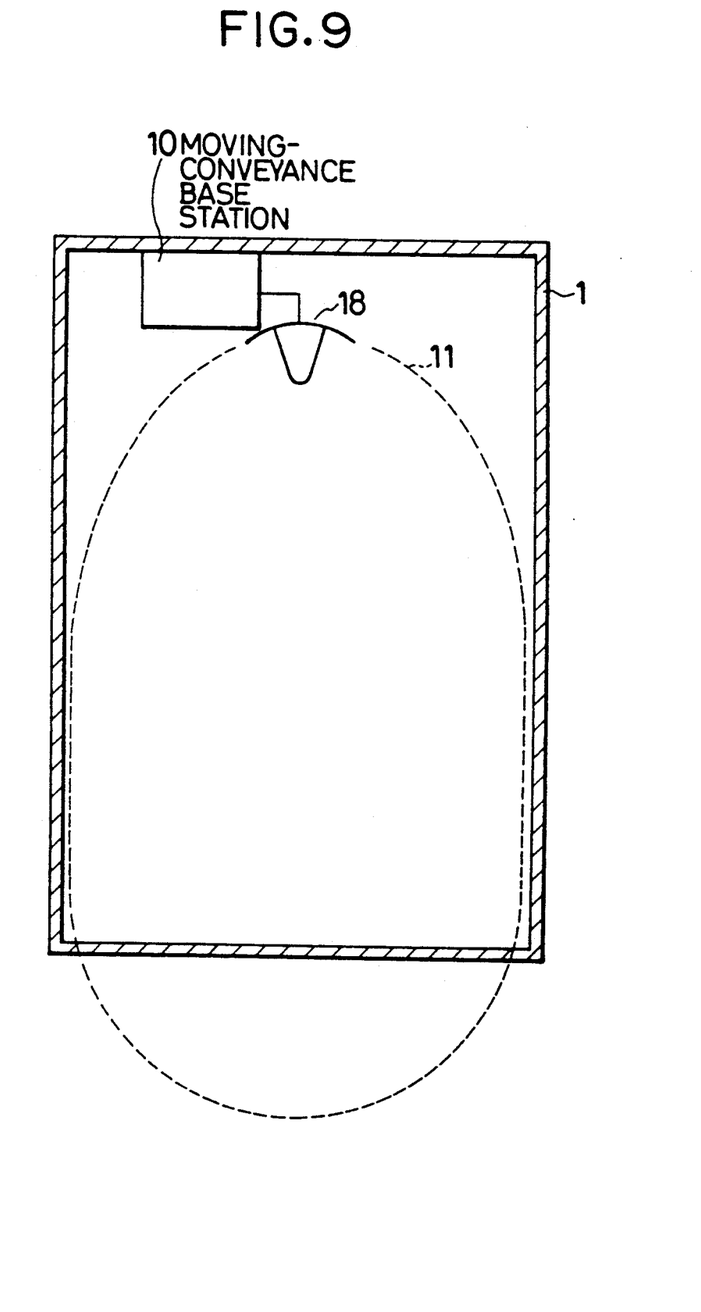
FIG. 9 illustrates a Cassegrain antenna for the moving-conveyance base station of FIG. 7.

Various types of directional antennas can be used to limit the service range 11 as shown in FIG. 7. For example, a helical antenna 17 can be used as illustrated in FIG. 8. Alternatively, a Cassegrain antenna 18 can be used as illustrated in FIG. 9 to provide particularly strong directivity.

Many buildings have two or more elevators installed side by side. A problem that arises in applying the invention to such buildings is crosstalk or other interference between calls in adjacent elevators. Such interference can occur if the portable telephones and moving-conveyance base stations transmit at power levels generally employed in cordless telephone systems, such as 10 mW. This problem can be solved, however, by controlling the transmitting power of the portable cordless telephones and the moving-conveyance base stations as described next.

Figure 10:
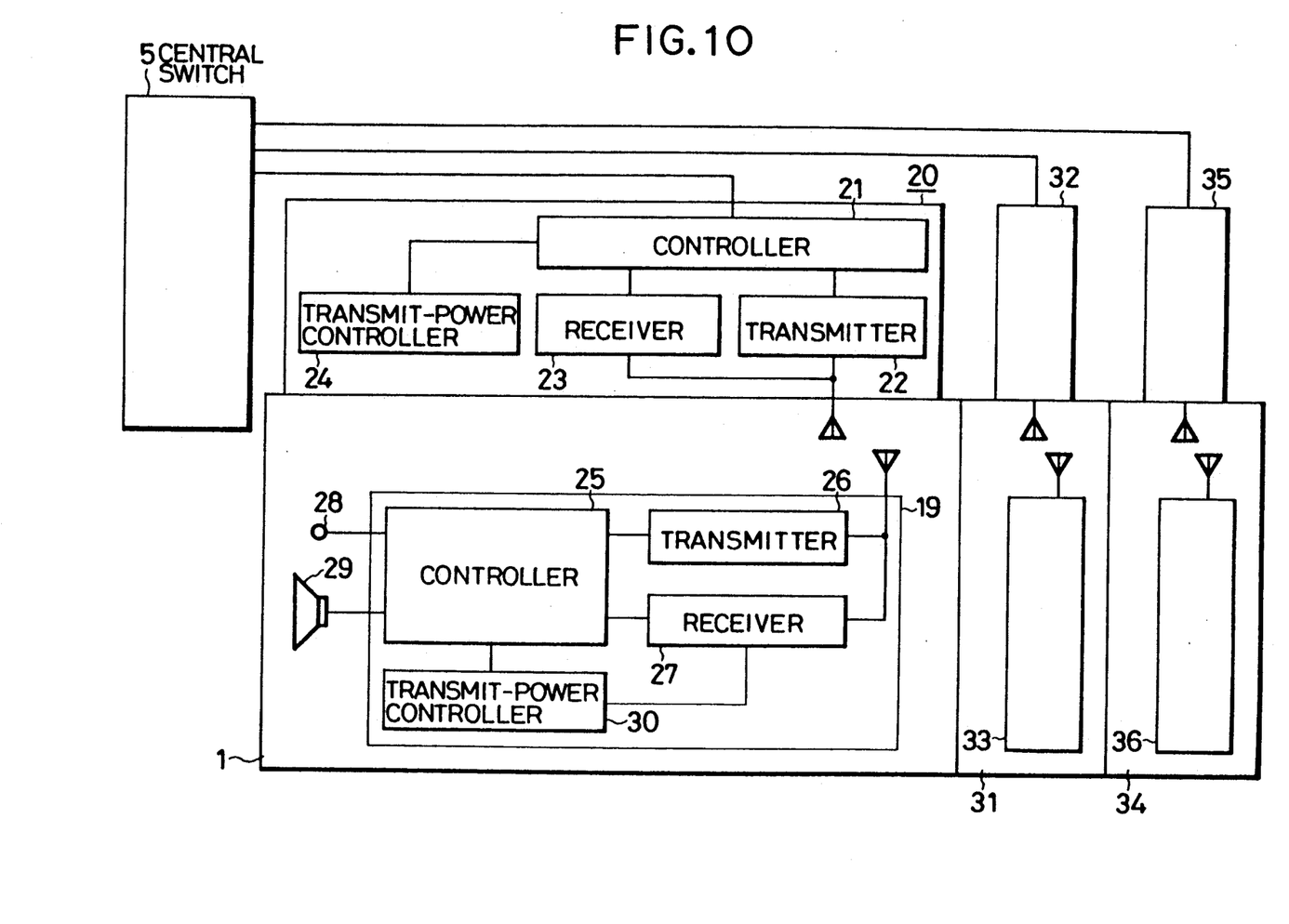
FIG. 10 illustrates a cordless telephone system for multiple adjacent elevators in which transmitting power is controlled from the portable cordless telephone.

Referring to FIG. 10, the elevator 1 and central switch 5 are the same as in the preceding figures. A person (not shown) has carried a portable cordless telephone 19 into the elevator 1, where it communicates with a moving-conveyance base station 20. The moving-conveyance base station 20 is shown as installed on the roof of the elevator 1, but this is not a restriction; the moving-conveyance base station 20 and its antenna can have any of the configurations shown in FIGS. 1 to 7.

The moving-conveyance base station 20 comprises a controller 21, a transmitter 22, a receiver 23, and a transmit-power controller 24. The controller 21 controls the overall operation of the moving-conveyance base station 20. The transmitter 22 and receiver 23, which are coupled between the controller 21 and the antenna of the moving-conveyance base station 20, transmit and receive signals on voice and control channels. The transmit-power controller 24 is coupled to the controller 21. The function of the transmit-power controller 24 is to control the power of the transmitter 22 according to control information received via the receiver 23, as described below.

The portable cordless telephone 19 comprises a controller 25, a transmitter 26, a receiver 27, a microphone 28, a speaker 29, and a transmit-power controller 30. The controller 25 controls the overall operation of the portable cordless telephone 19. The transmitter 26 and the receiver 27, which are coupled between the controller 25 and the antenna of the portable cordless telephone 19, transmit and receive signals on voice and control channels. The microphone 28 and the speaker 29, which are coupled to the controller 25, perform audio input and output. The function of the transmit-power controller 30 is to detect the field strength of signals received by the receiver 27, determine a transmit-power setting therefrom, control the power of the transmitter 26 according to this setting, and cause the transmitter 26 to transmit this setting as control information.

A second elevator 31 having a moving-conveyance base station 32 is installed adjacent to the elevator 1. A second person (not shown) has carried a second portable cordless telephone 33 into the elevator 31. Moreover, a third elevator 34 having a moving-conveyance base station 35 is installed adjacent to the elevator 31, and a third person (not shown) has carried a third portable cordless telephone 36 into the elevator 34. The moving-conveyance base stations 32 and 35 are similar to the moving-conveyance base station 20. The portable cordless telephones 33 and 36 are similar to the portable cordless telephone 19.

The central switch 5 is coupled via wires to the moving-conveyance base stations 20, 32 and 35. It is also coupled via wires to fixed base stations, extension telephones, and one or more common-carrier lines as in FIG. 1.

Next the operations of originating and answering calls will be described.

The moving-conveyance base stations 20, 32, and 35 send polling signals which are answered by identification signals as described previously. With the disposition shown in FIG. 10, this will generally result in assignment of the portable cordless telephone 19 to the moving-conveyance base station 20, the portable cordless telephone 33 to the moving-conveyance base station 32, and the portable cordless telephone 36 to the moving-conveyance base station 35. In addition, when the portable cordless telephone 19 receives polling signals from the moving-conveyance base station 20, for example, the transmit-power controller 30 detects the received field strength of the polling signals and determines a transmit-power setting that is adequate for communication between the portable cordless telephone 19 and the closely proximate moving-conveyance base station 20, but no so high as to cause crosstalk or other types of interference with calls made in the elevator 31 or the elevator 34.

When a call is placed from the portable cordless telephone 19 in the elevator 1, the portable cordless telephone 19 sends a call originating signal to the central switch 5 via the moving-conveyance base station 20. The transmit-power setting determined by the transmit-power controller 30 is included as control information in this call originating signal. The controller 21 in the moving-conveyance base station 20 passes this control information to the transmit-power controller 24.

The transmit-power controller 24 in the moving-conveyance base station 20 and the transmit-power controller 30 in the portable cordless telephone 19 control the power levels of the transmitter 22 and the transmitter 26 according to this transmit-power setting. The transmitters 22 and 26 therefore operate at a power level that, while sufficient for communication between the portable cordless telephone 19 and the moving-conveyance base station 20, does not interfere with communication in the adjacent elevators 31 and 34.

When a call is placed from another telephone to the portable cordless telephone 19 in the elevator 1, the portable cordless telephone 19 receives a call originating signal from the moving-conveyance base station 20 and sends back a call answering signal in which the transmit-power setting determined by the transmit-power controller 30 is included as control information. The controller 21 passes this control information to the transmit-power controller 24. As before, the transmit-power controller 24 and the transmit-power controller 30 control the transmitter 22 and the transmitter 26 so that they operate at a power level adequate for mutual communication, but not high enough to interfere with calls in adjacent elevators.

Calls originated or received in the elevators 31 and 34 are controlled in a like manner. Thus calls can be made simultaneously in all three elevators without mutual interference or crosstalk.

Figure 11:
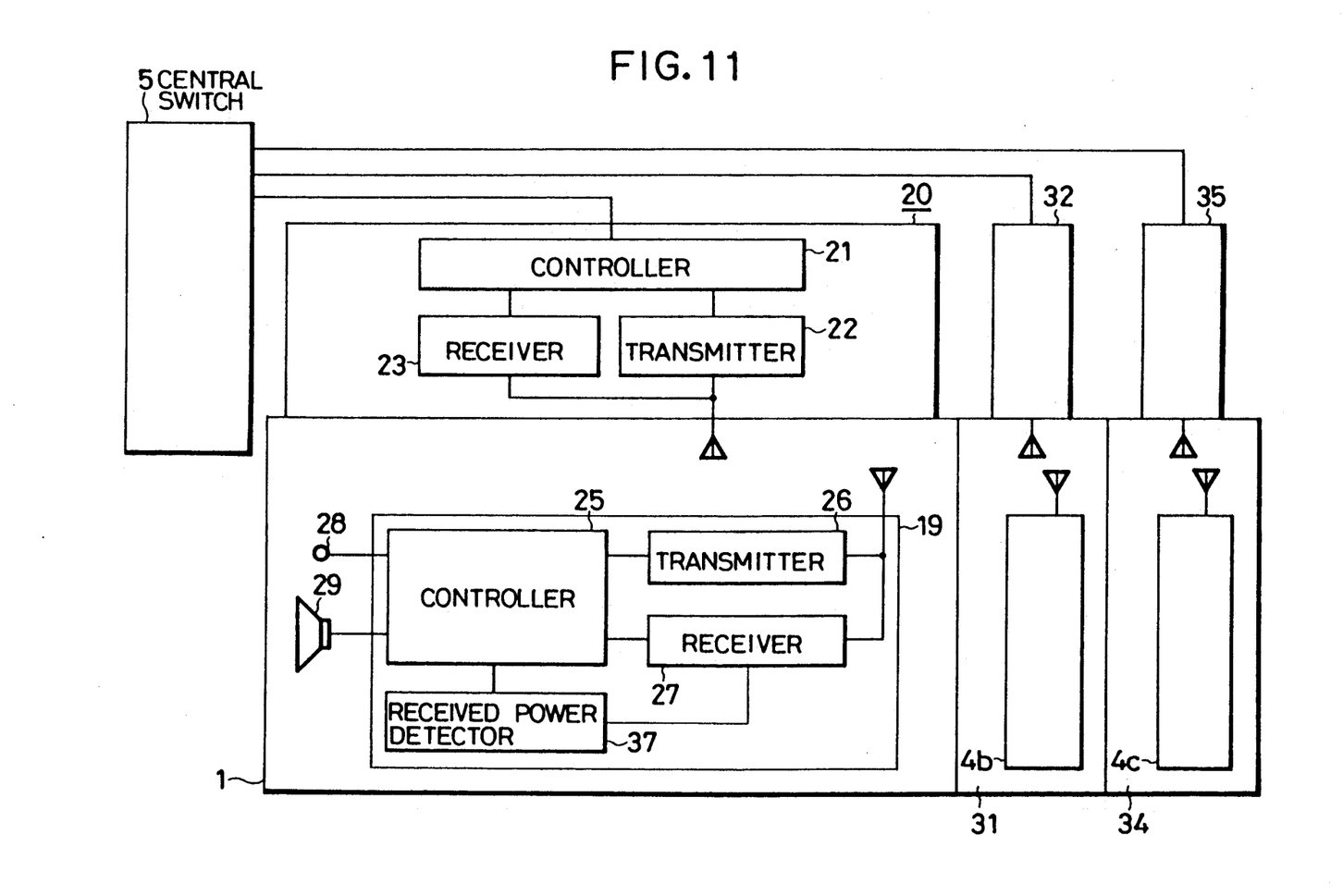
FIG. 11 illustrates a cordless telephone system for multiple adjacent elevators in which the portable cordless telephone detects received field strength.

FIG. 11 illustrates another cordless telephone system for use in a building with adjacent elevators. Elements identical or equivalent to elements in FIG. 10 have the same reference numerals, and descriptions of these elements will be omitted.

The moving-conveyance base station 20, 32, and 35 are generally similar to those in FIG. 10. The transmit-power controllers 24 and 30 of FIG. 10 are not shown in FIG. 11, but they may be additionally present.

The portable cordless telephone 19, 31, and 34 are generally similar to those in FIG. 10 but each now has a received power detector 37 coupled to the controller 25 and receiver 27, for detecting received field strength and, when the received field strength falls below an adequate threshold, generating a hand-off request signal. In the normal case in which the portable cordless telephone 19 is assigned to the moving-conveyance base station 20, the portable cordless telephone 33 to the moving-conveyance base station 32, and the portable cordless telephone 36 to the moving-conveyance base station 35, the received field strength during calls is well above the adequate threshold, and operation proceeds as described previously.

Figure 12:
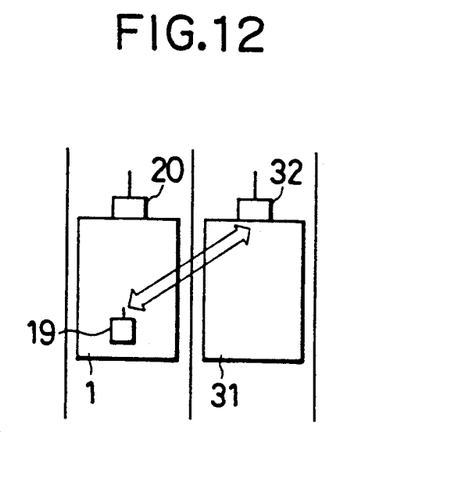
FIG. 12 illustrates a wireless circuit between a portable cordless telephone in one elevator and a moving-conveyance base station in a different elevator.

Referring to FIG. 12, momentary power fluctuations, timing conditions, or other factors may cause the portable cordless telephone 19 in the elevator 1, for example, to be assigned to the moving-conveyance base station 32 in the adjacent elevator 31. In this case calls originated or answered by the portable cordless telephone 19 are routed via the moving-conveyance base station 32, as illustrated. As long as the two elevators 1 and 31 remain adjacent, as when both elevators halt at the same floor or both move side-by-side at the same speed in the same direction, the wireless circuit between the portable cordless telephone 19 and the moving-conveyance base station 32 is maintained without particular problem.

Figure 13:
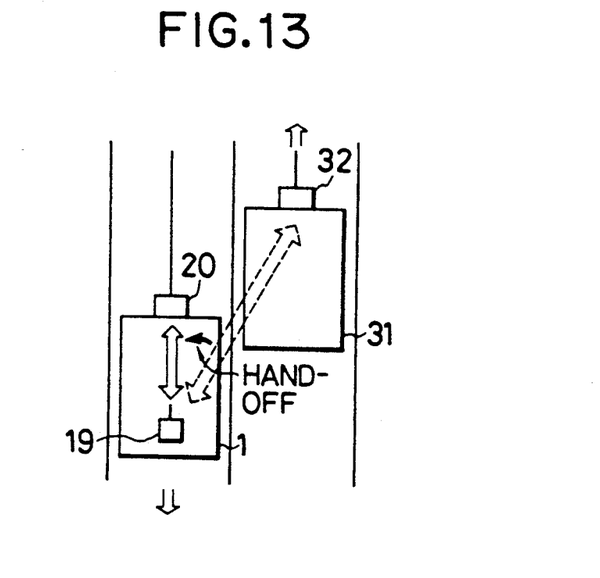
FIG. 13 illustrates hand-off of the wireless circuit in FIG. 12.

If the two elevators 1 and 31 move in opposite directions as illustrated in FIG. 13, however, the increasing distance between the portable cordless telephone 19 and the moving-conveyance base station 32 leads to a reduction in received field strength. When the received field strength falls below the above-mentioned adequate threshold, the received power detector 37 in the portable cordless telephone 19 generates a hand-off request signal.

The hand-off request signal is picked up by all base stations in the vicinity of the portable cordless telephone 19, including in particular the elevator base stations 20 and 32 in FIG. 13. Each base station relays the hand-off request signal to the central switch 5. On the basis of the power with which the hand-off request signal is received at different base stations, the central switch 5 selects a base station with an adequate received field strength and hands the call off to that base station. In FIG. 13, the call is handed off to the moving-conveyance base station 20 of the elevator 1.

This method of hand-off request signals can also be used to hand off calls from a moving-conveyance base station to a fixed base station when the person using the portable cordless telephone leaves the elevator, or from one fixed base station to another when the person moves from one room to another in the building. An advantage of this method is that the task of monitoring received field strengths can be largely shifted from the central switch 5 to the portable cordless telephones, thereby enhancing the expansibility of the cordless telephone system.

Figure 14:
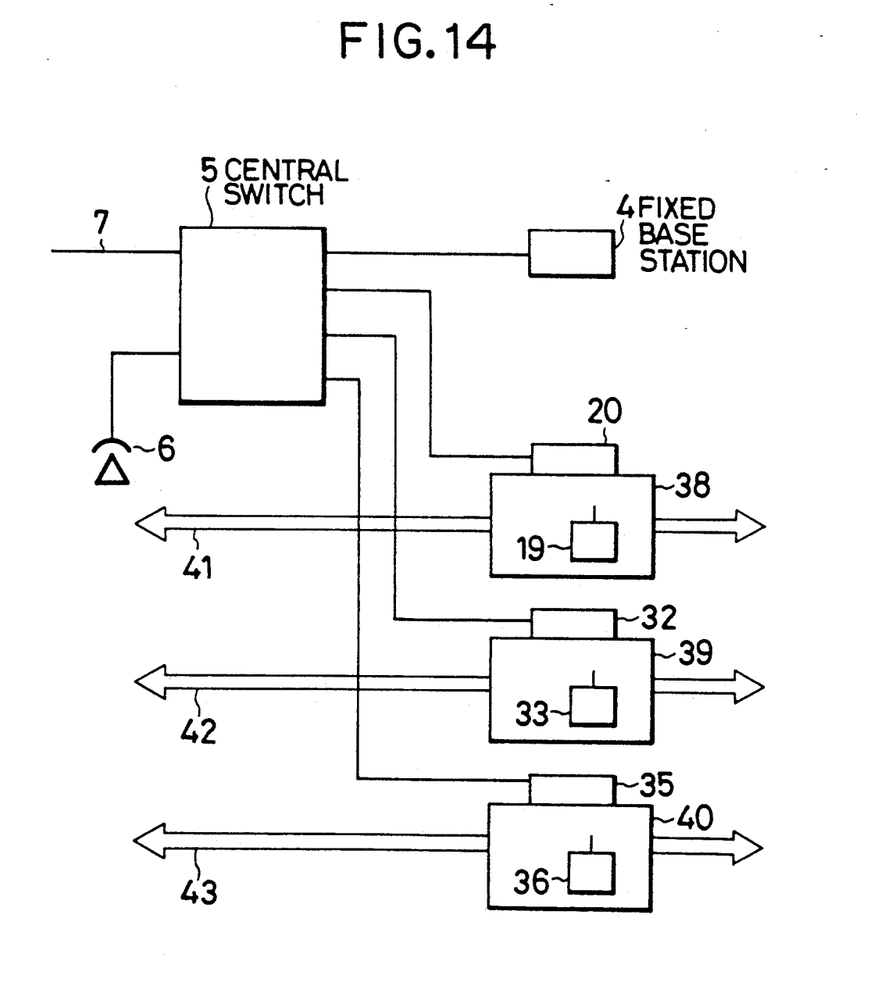
FIG. 14 illustrates a cordless telephone system for multiple moving cranes.

Referring to FIG. 14, the novel cordless telephone system can also be applied in a factory with overhead cranes. The fixed base station 4, central switch 5, extension telephone 6, and common-carrier line 7 in FIG. 14 are similar to those in FIGS. 1 to 7, and the portable cordless telephones 19, 33, and 36 and moving-conveyance base stations 20, 32, and 35 are similar to those in FIG. 10 or 11. The moving-conveyance base stations 20, 32, and 35 are installed in three cranes 38, 39, and 40 that travel along parallel tracks 41, 42, 43 in order to move objects in the factory. The portable cordless telephone 19, 33 and 36 are used by operators (not shown) who ride in the cranes 38, 39, and 40.

The cranes 38, 39, and 40 move in a horizontal instead of a vertical direction, but except for that difference the system in FIG. 14 operates in the same way as the systems illustrated in the preceding figures. A detailed description will be omitted.

The invention is applicable not only to elevators and cranes but more generally to any type of moving conveyance installed in a building. The fixed base stations need not be disposed on ceilings of the building as shown in FIGS. 1 to 7; they can also be installed under floors, on walls, or in other suitable locations. The portable cordless telephones and base stations may exchange control information other than that described above, e.g. the base stations may send channel selection signals to the portable cordless telephones. These and other modifications, which will be apparent those skilled in the art, can be made without departing from the spirit and scope of the invention, which should be determined solely from the following claims.

What is claimed is:

1. A cordless telephone system for a building in which a moving conveyance is installed, comprising:
   a portable cordless telephone for making calls;
   at least one fixed base station installed in said building, for wireless communication with said portable cordless telephone;
   a moving-conveyance base station for wireless communication with said portable cordless telephone when said portable cordless telephone is disposed in the moving conveyance; and
   a central switch, coupled to said fixed base station and said moving-conveyance base station, for handing off said calls between said fixed base station and said moving-conveyance base station.

2. The system of claim 1, wherein said fixed base station and said moving-conveyance base station send polling signals, said portable cordless telephone sends identification signals in reply to said polling signals, and said central switch hands off calls according received field strength of said identification signals at said fixed base station and said moving-conveyance base station.

3. The system of claim 1, wherein said building has an elevator shaft and said moving conveyance is an elevator that travels in said elevator shaft.

4. The system of claim 3, also comprising a radiating coaxial cable installed in said elevator shaft and coupled to said moving-conveyance base station for use as an antenna of said moving-conveyance base station.

5. The system of claim 3, also comprising a leakage waveguide installed in said elevator shaft and coupled to said moving-conveyance base station for use as an antenna of said moving-conveyance base station.

6. The system of claim 3, wherein said moving-conveyance base station is installed in said elevator.

7. The system of claim 6, wherein said moving-conveyance base station is installed in a ceiling cavity of said elevator.

8. The system of claim 6, wherein said moving-conveyance base station is installed in a floor cavity of said elevator.

9. The system of claim 6, wherein said moving-conveyance base station is installed on an upper external surface of said elevator.

10. The system of claim 6, wherein said moving-conveyance base station has a directional antenna adapted so that said moving-conveyance base station can communicate with said portable cordless telephone only when said portable cordless telephone is disposed inside said elevator.

11. The system of claim 6, wherein said directional antenna is a helical antenna.

12. The system of claim 6, wherein said directional antenna is a Cassegrain antenna.

13. A cordless telephone system for a building having a first moving conveyance and a second moving conveyance that moves adjacent and parallel to the first moving conveyance, comprising:

a portable cordless telephone for making calls;

at least one fixed base station installed in said building, for wireless communication with said portable cordless telephone;

a first moving-conveyance base station for wireless communication with said portable cordless telephone when said portable cordless telephone is disposed in said first moving conveyance;

a second moving-conveyance base station for wireless communication with said portable cordless telephone when said portable cordless telephone is disposed in said second moving conveyance; and a central switch coupled to said fixed base station, said first moving-conveyance base station, and said second moving-conveyance base station, for handing off calls among said fixed base station, said first moving-conveyance base station, and said second moving-conveyance base station according to signals received from said portable cordless telephone.

14. The system of claim 13, wherein said first moving conveyance and said second moving conveyance are elevators.

15. The system of claim 13, wherein said first moving conveyance and said second moving conveyance are cranes.

16. The system of claim 13, wherein said portable cordless telephone has a transmit-power controller for determining a transmit-power setting according to field strength received by said portable cordless telephone, controlling power transmitted by said portable cordless telephone according to said transmit-power setting, and causing said portable cordless telephone to transmit control information indicating said transmit-power setting.

17. The system of claim 16, wherein said portable cordless telephone transmits said control information in call originating signals and call answering signals.

18. The system of claim 16, wherein said first moving-conveyance base station and said second moving-conveyance base station have respective transmit-power controllers for controlling power transmitted by said first moving-conveyance base station and said second moving-conveyance base station, according to said control information.

19. The system of claim 13, wherein said portable cordless telephone has a received-power detector for detecting field strength received by said portable cordless telephone and generating a hand-off request signal when said field strength falls below a certain threshold.

20. The system of claim 19, wherein said central switch hands off calls made using said portable cordless telephone according to received field strength of said hand-off request signal at said fixed base station, said first moving-conveyance station, and said second moving-conveyance station.

* * * * *